(12) United States Patent
Jin et al.

(10) Patent No.: US 10,155,861 B2
(45) Date of Patent: Dec. 18, 2018

(54) NUCLEATION WITH A BLOCK COMPOSITE NUCLEATOR

(71) Applicant: Dow Global Technologies LLC, Midland, MI (US)

(72) Inventors: Yi Jin, Missouri City, TX (US); Kim L. Walton, Lake Jackson, TX (US); Morgan M. Hughes, Angleton, TX (US); Thomas W. Karjala, Lake Jackson, TX (US); Lamy J. Chopin, III, Missouri City, TX (US); Dean Lee, Midland, MI (US); Rongjuan Cong, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/505,475

(22) PCT Filed: Aug. 20, 2015

(86) PCT No.: PCT/US2015/046002
§ 371 (c)(1),
(2) Date: Feb. 21, 2017

(87) PCT Pub. No.: WO2016/028957
PCT Pub. Date: Feb. 25, 2016

(65) Prior Publication Data
US 2017/0240735 A1    Aug. 24, 2017

Related U.S. Application Data

(60) Provisional application No. 62/039,941, filed on Aug. 21, 2014.

(51) Int. Cl.
*C08L 53/00* (2006.01)
*C08L 23/14* (2006.01)
(Continued)

(52) U.S. Cl.
CPC ............. *C08L 23/16* (2013.01); *C08L 23/142* (2013.01); *C08L 23/14* (2013.01); *C08L 53/00* (2013.01);
(Continued)

(58) Field of Classification Search
CPC .... C09J 153/00; C09J 123/14; C09J 123/142; C09J 123/20
See application file for complete search history.

(56) References Cited

U.S. PATENT DOCUMENTS

2006/0135699 A1* 6/2006 Li ........................... C08L 23/10
525/240
2008/0085977 A1* 4/2008 Okamoto ................ C08L 23/10
525/240

(Continued)

FOREIGN PATENT DOCUMENTS

WO  2005/035598 A1  4/2005
WO  2008/088995 A1  7/2008

OTHER PUBLICATIONS

International Search Report and Written Opinion for PCT/US2015/046002, dated 2015, pp. 1-8.

(Continued)

*Primary Examiner* — Richard A Huhn

(57) ABSTRACT

A composition includes (A) 30-95 wt % of a random or homogeneous propylene-based interpolymer having: (i) a comonomer content of at least one of $C_2$ and $C_{4-10}$ α-olefins of 7 wt % to 49 wt % based on the total weight of the propylene-based interpolymer, (ii) a density of 0.90 g/cc or less, and (iii) an MFR of 1 g/10 min or greater (230° C./2.16 kg); and (B) 5-70 wt % of a block composite nucleator comprising: (1) a first polymer that includes polypropylene; (2) a second polymer that includes an alpha-olefin based polymer, the alpha-olefin being selected from at least one of a $C_2$ and $C_{4-10}$ α-olefins, and (3) a block copolymer having (Continued)

a first segment and a second segment, the first segment of the block copolymer having the same composition as the first polymer in the block composite nucleator and the second segment of the block copolymer having the same composition as the second polymer of the block composite nucleator.

7 Claims, 10 Drawing Sheets

(51) Int. Cl.
*C08L 23/16* (2006.01)
*C09J 153/00* (2006.01)
*C09J 123/14* (2006.01)
*C09J 123/20* (2006.01)

(52) U.S. Cl.
CPC ... *C08L 2205/025* (2013.01); *C08L 2205/035* (2013.01); *C08L 2205/24* (2013.01); *C09J 123/142* (2013.01); *C09J 123/20* (2013.01); *C09J 153/00* (2013.01)

(56) References Cited

U.S. PATENT DOCUMENTS

| | | |
|---|---|---|
| 2008/0269412 A1 | 10/2008 | Carnahan et al. |
| 2011/0313106 A1 | 12/2011 | Shan et al. |
| 2011/0313107 A1 | 12/2011 | Shan et al. |
| 2011/0313108 A1 | 12/2011 | Shan et al. |
| 2012/0108134 A1 | 5/2012 | Chee et al. |
| 2012/0128907 A1* | 5/2012 | Mounts ............... B29C 65/04 428/35.2 |
| 2013/0183465 A1* | 7/2013 | Liang ............... B32B 27/32 428/35.2 |
| 2014/0221951 A1 | 8/2014 | Chang et al. |

OTHER PUBLICATIONS

International Preliminary Report on Patentability for PCT/US2015/046002, dated 2017, pp. 1-6.

\* cited by examiner

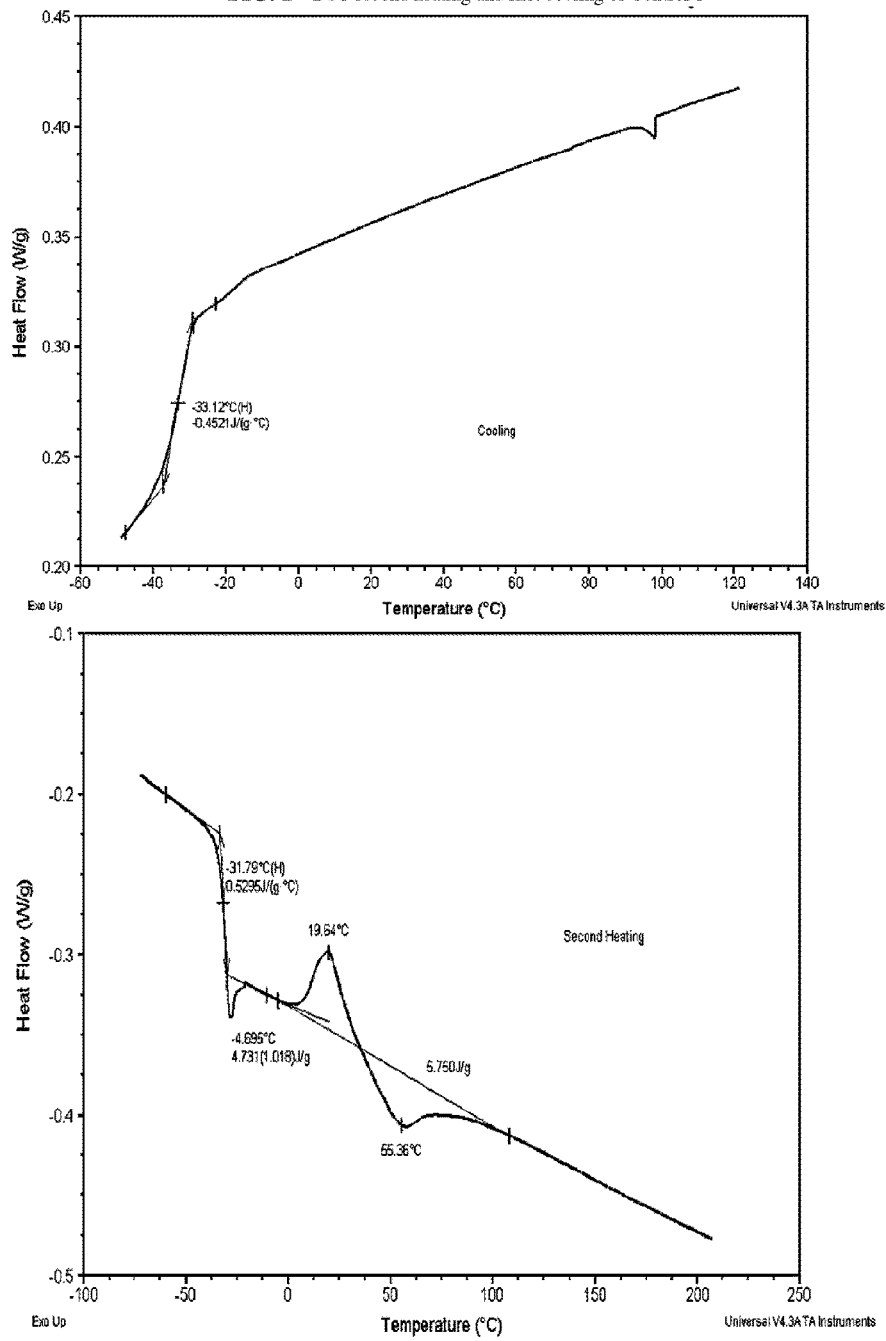
FIG. 1 - DSC second heating and first cooling of Control 1

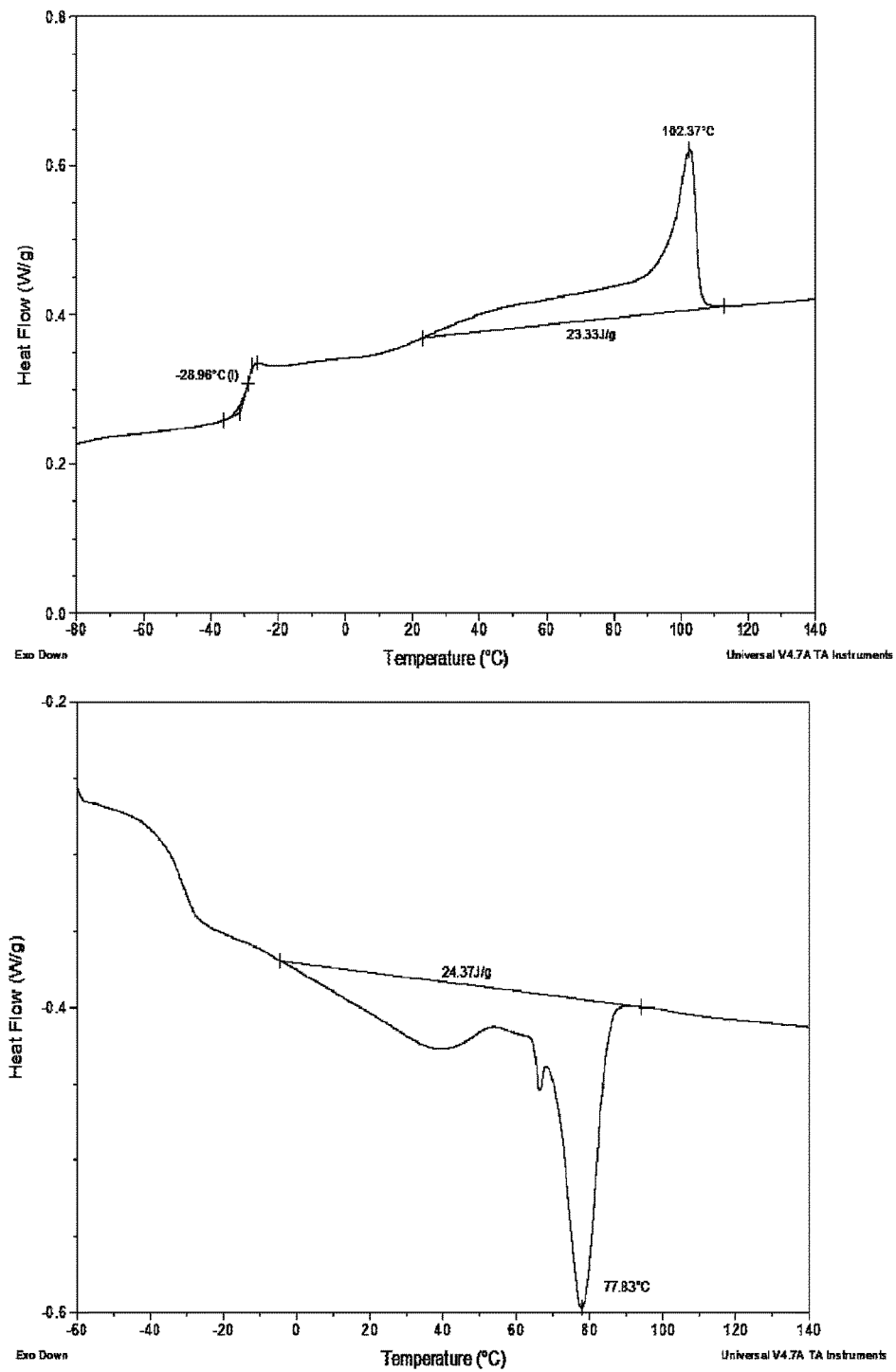
FIG. 2 - DSC second heating and first cooling of Inventive Example 1

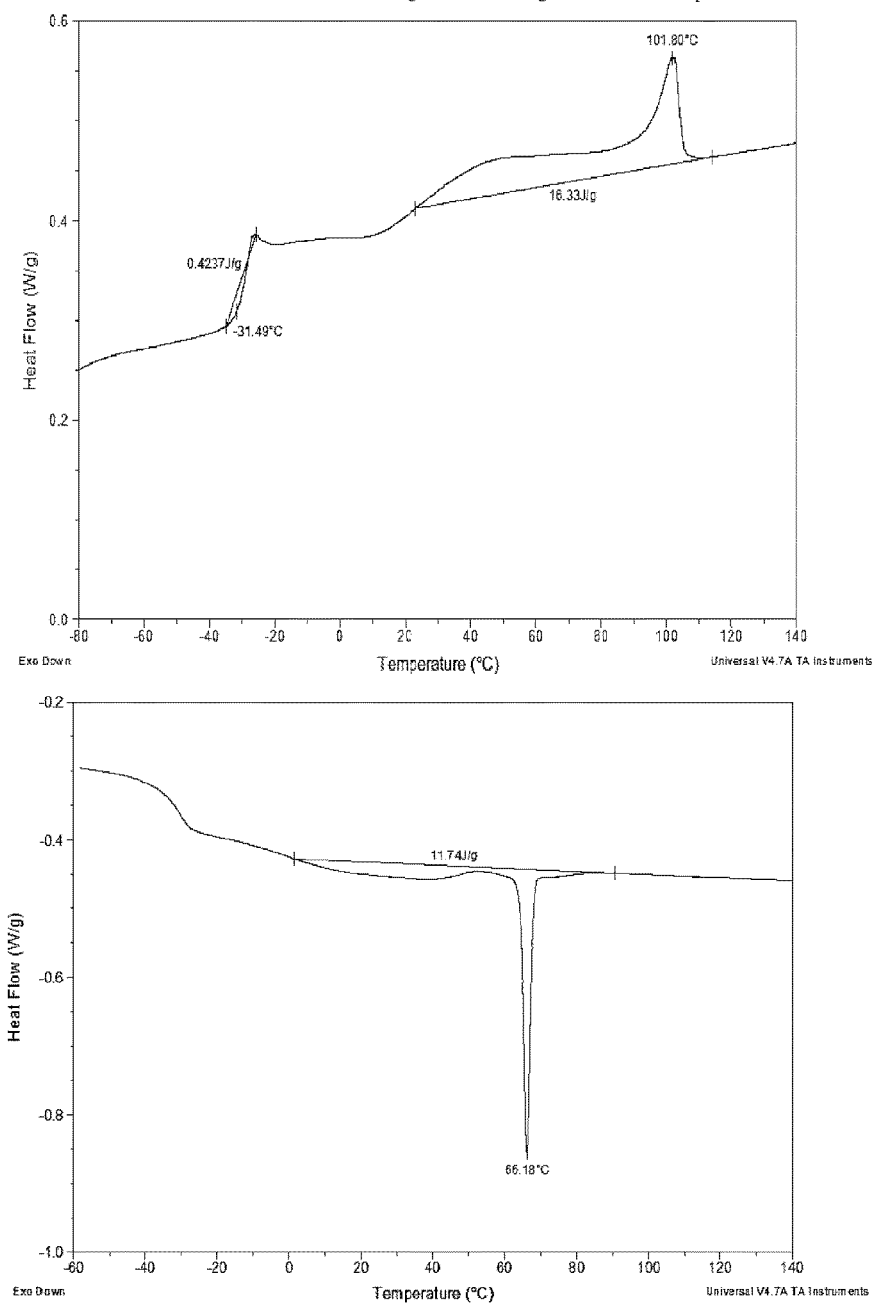
FIG. 3 - DSC second heating and first cooling of Inventive Example 2

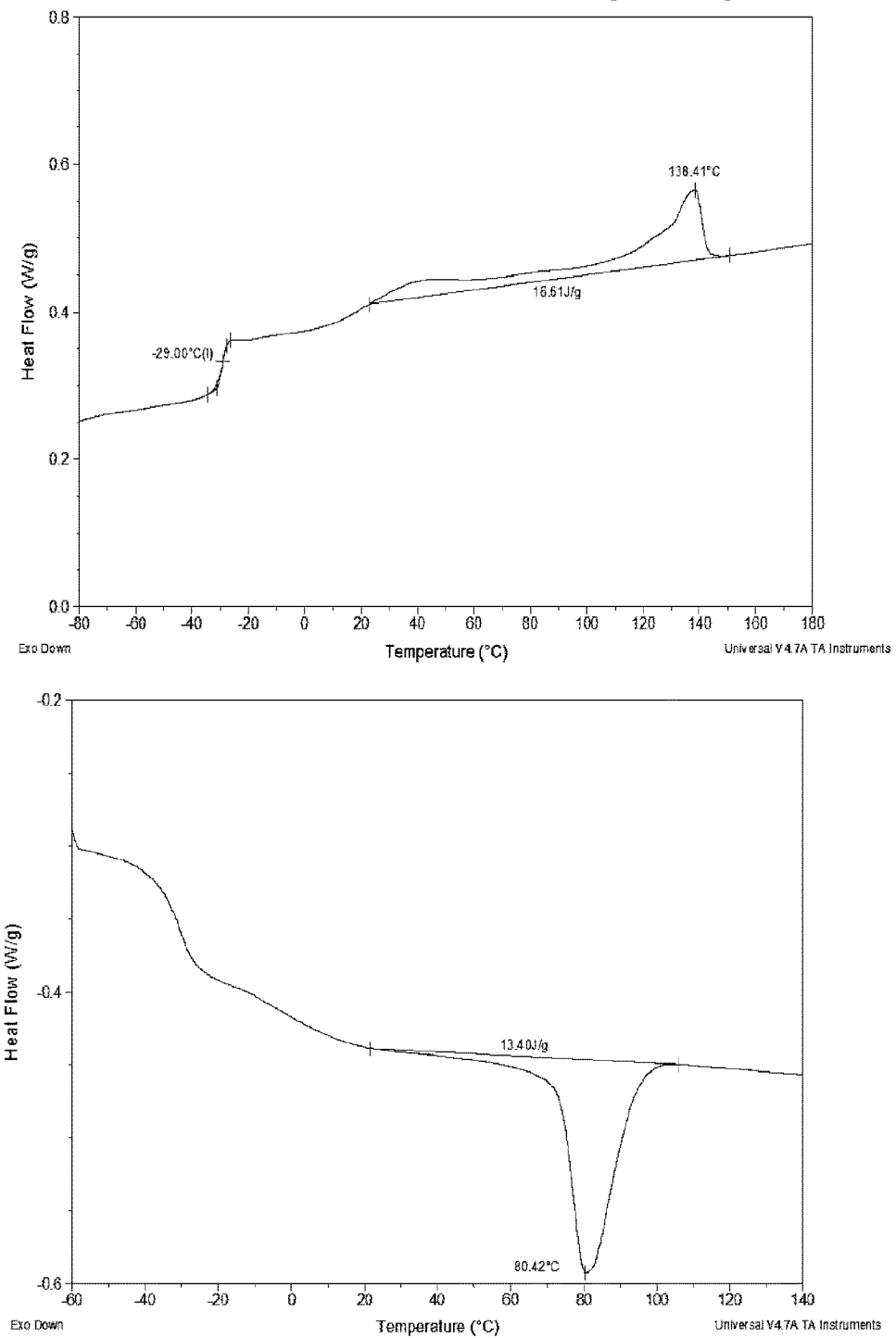
FIG. 4 - DSC second heating and first cooling of Comparative Example A

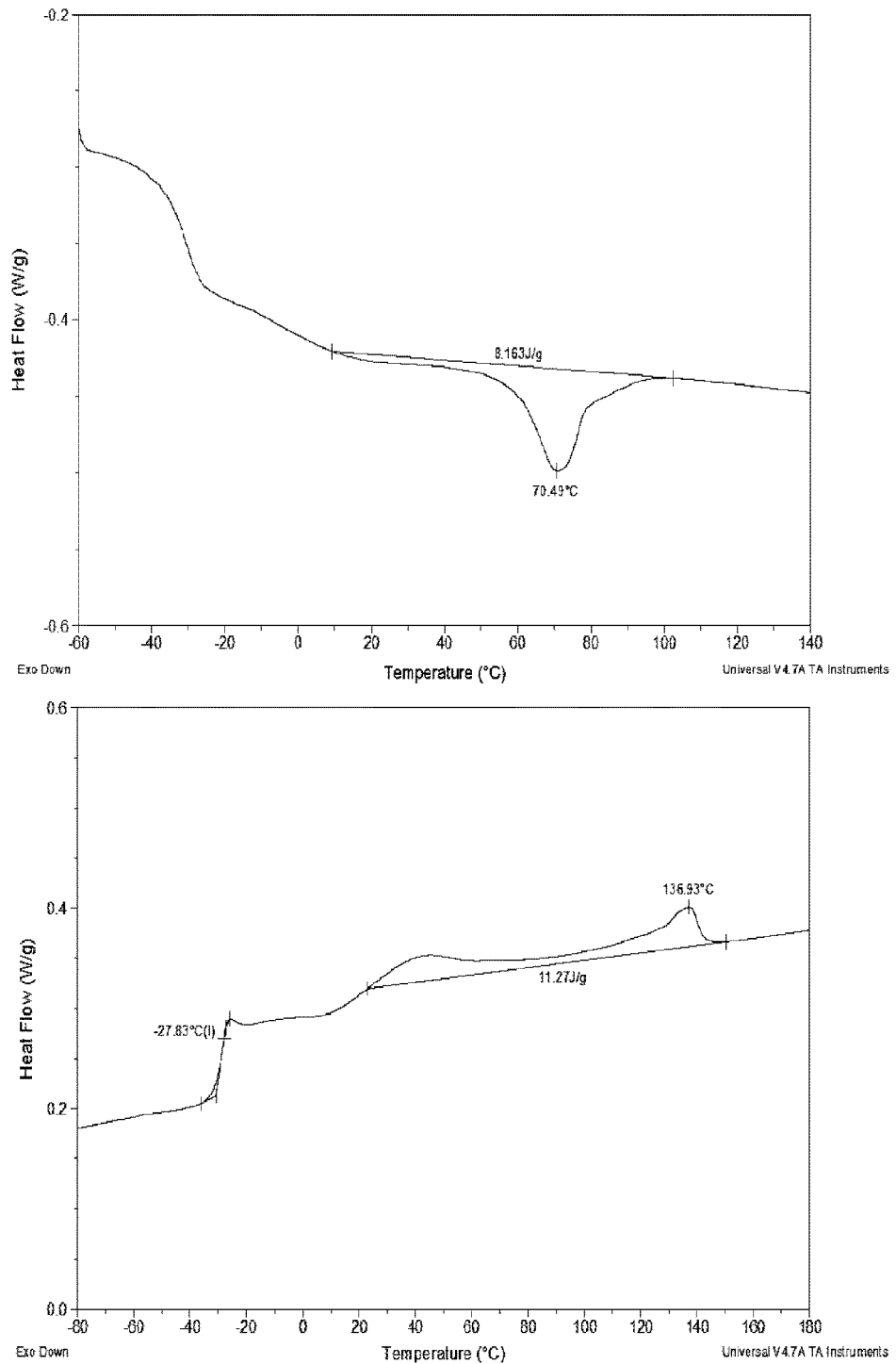
FIG. 5 - DSC second heating and first cooling of Comparative Example B

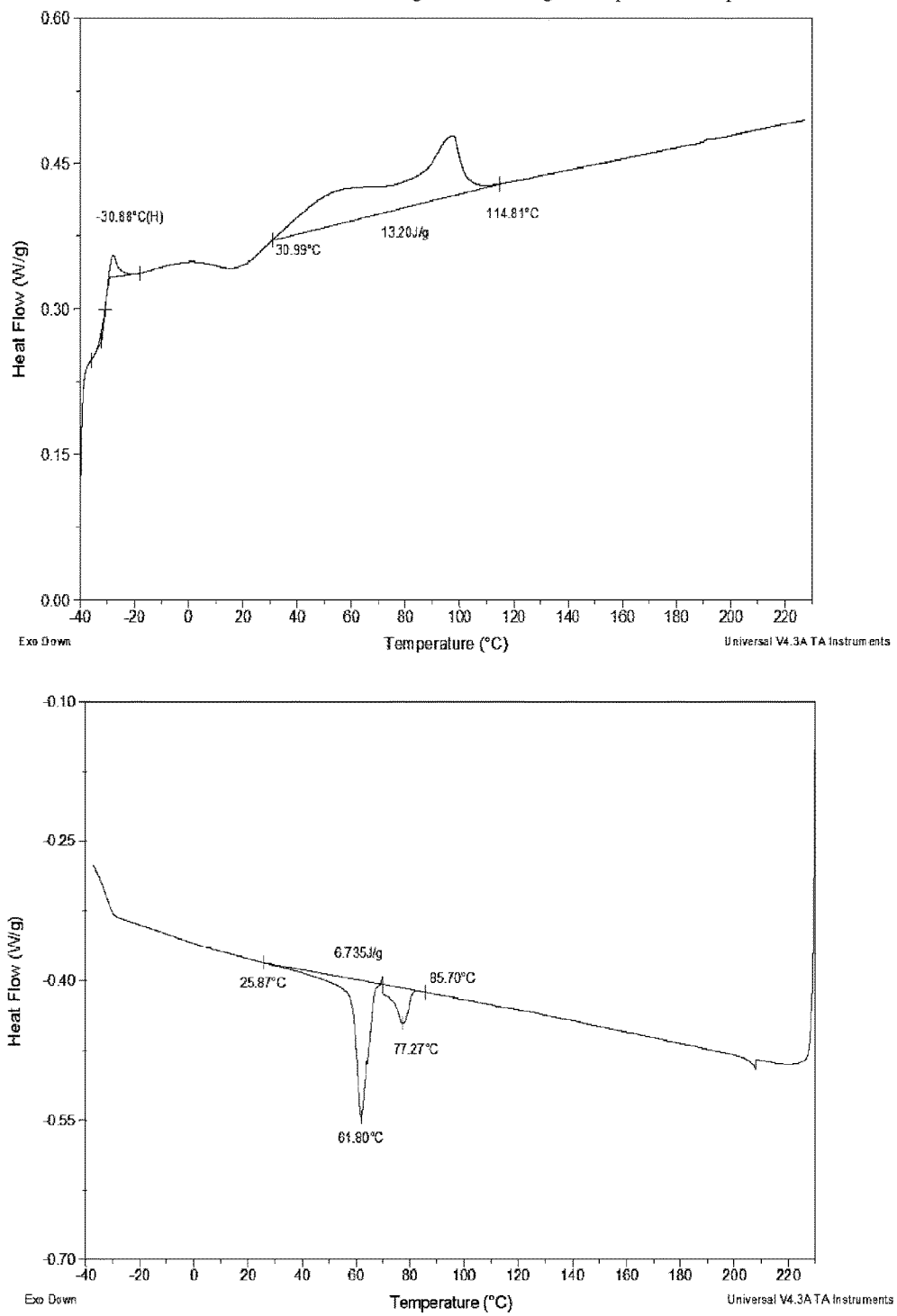
FIG. 6 - DSC second heating and first cooling of Comparative Example C

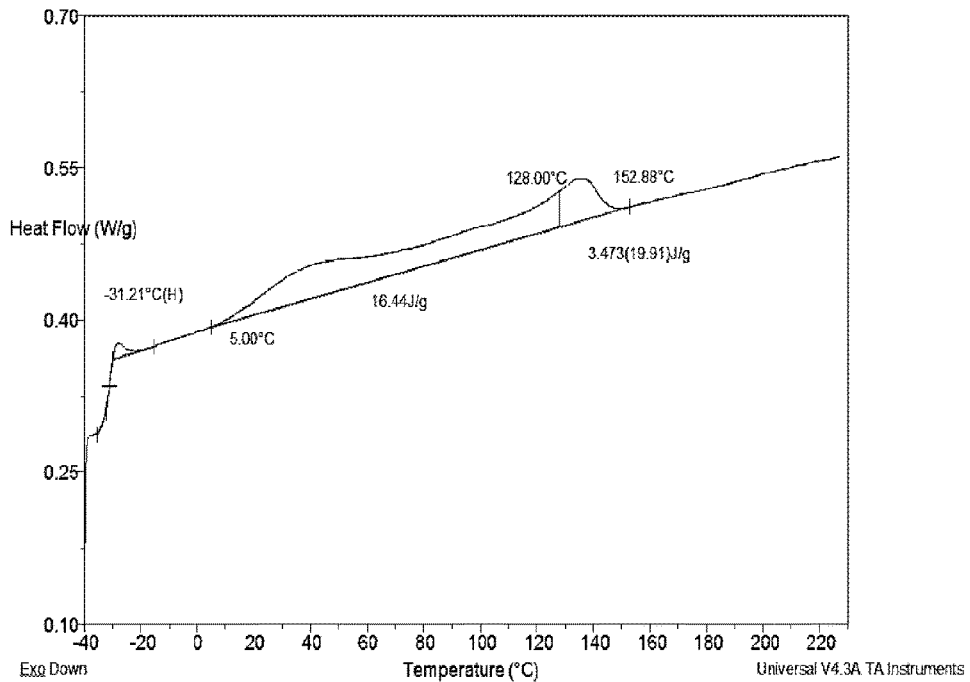
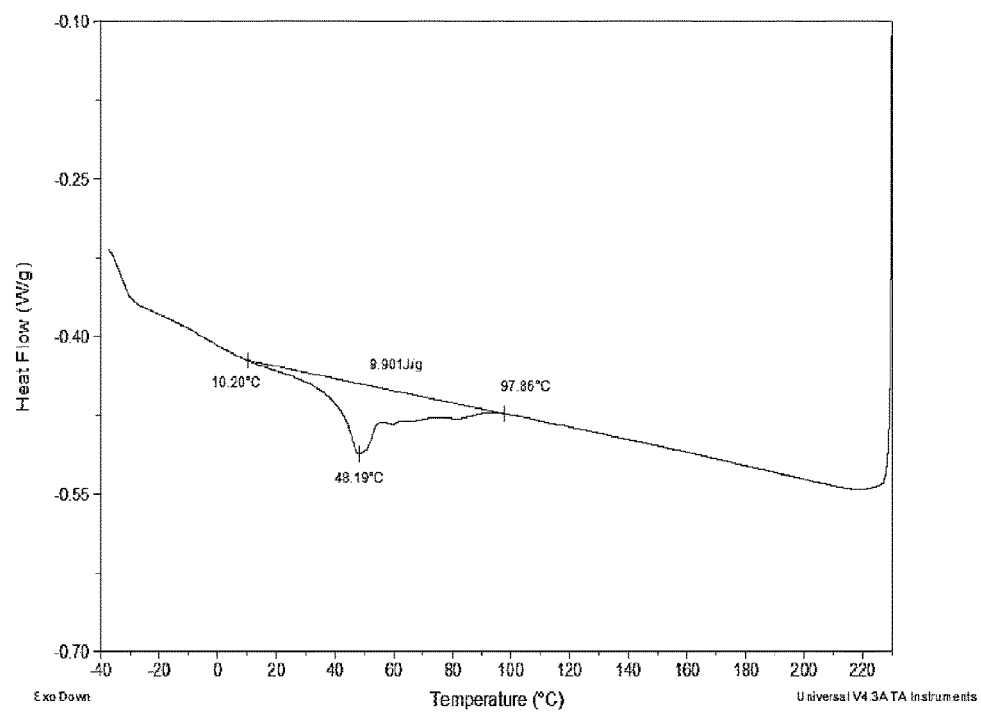
FIG. 7 - DSC second heating and first cooling of Comparative Example D

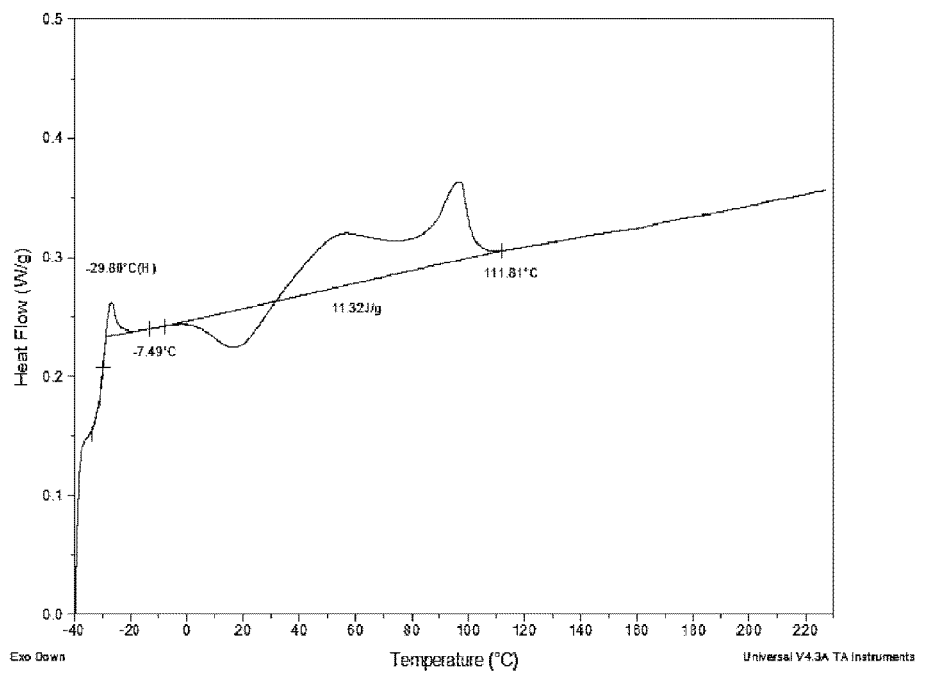
FIG. 8 - DSC second heating and first cooling of Comparative Example E
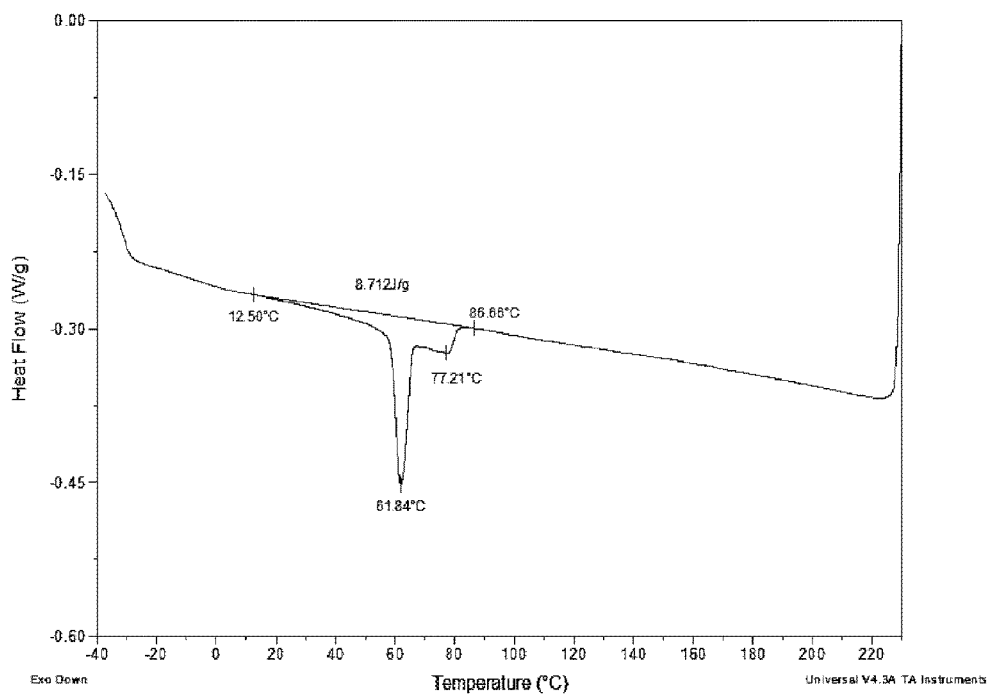

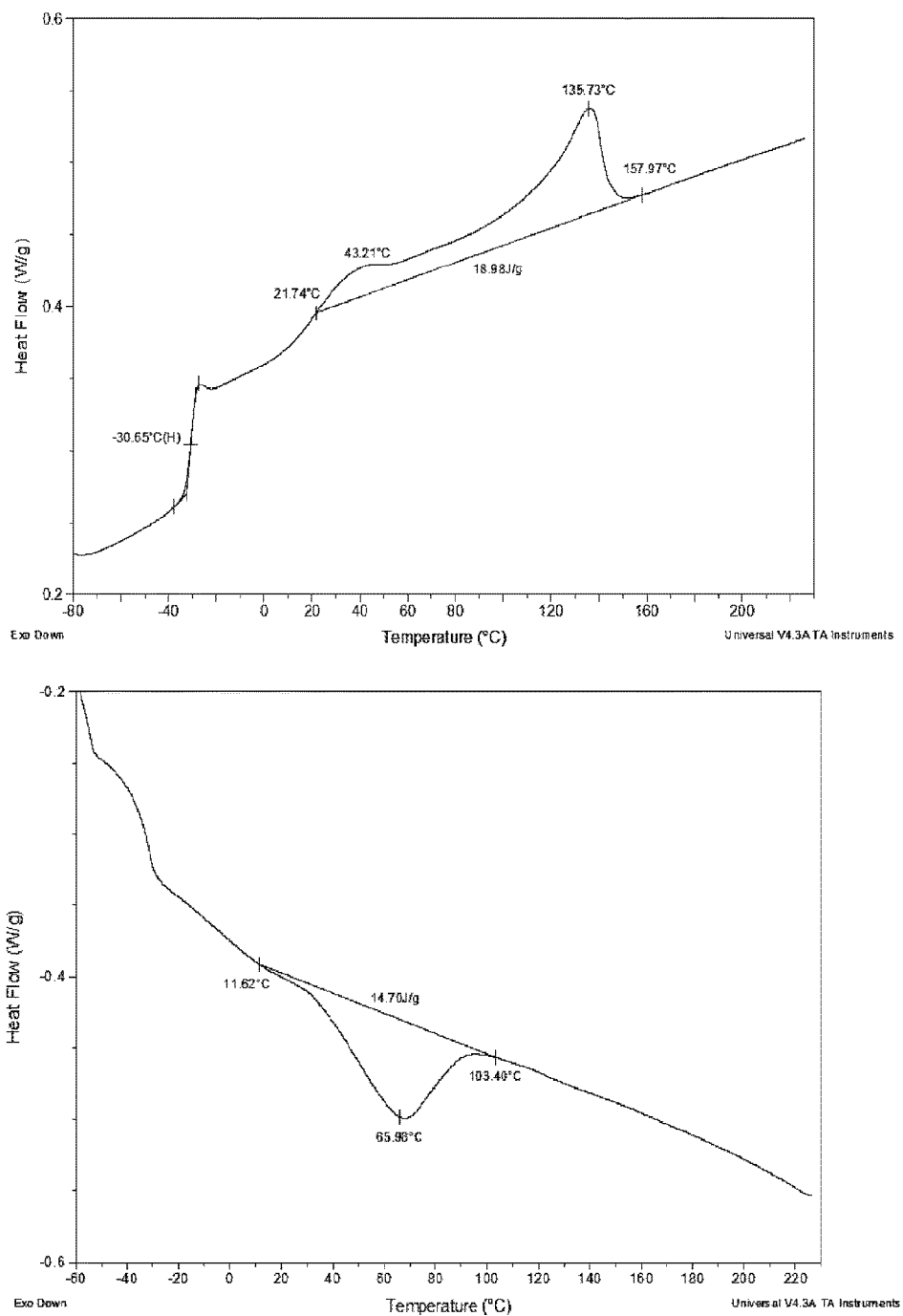
FIG. 9 - DSC second heating and first cooling of Comparative Example F

NUCLEATION WITH A BLOCK COMPOSITE NUCLEATOR

FIELD

Embodiments relate to a block composite nucleator (BCN) for nucleation of a high comonomer content propylene-based interpolymer.

INTRODUCTION

A method of modifying the properties of polypropylene, either as a homopolymer or as a random copolymer, is to modify crystalline structure such as to achieve a highly crystallized structure. The onset of crystallization is known as nucleation (i.e., a nucleus for starting a crystalline formation process), and this may occur randomly throughout the polymer matrix as the individual polymer molecules begin to align. Alternatively, nucleation may occur at the interface of a foreign impurity or an intentionally added nucleating agent. The proper use of nucleating agents can result in unique and desirable crystalline structures and promote the efficiency of a given process (e.g., by shortening process times and/or initiating nucleation at higher temperatures).

Further, high comonomer content propylene/alpha-olefin copolymers with homogeneous composition distribution and narrow molecular weight distribution (MWD or Mw/Mn) are known to have a slow crystallization rate, for which the analysis of the crystallization behavior may be conducted by utilizing differential scanning calorimetry (DSC) that can show a pronounced increase in the crystallization peak and onset temperatures. Using DSC for analysis, a first heating, a first cooling, and a second heating may be conducted. The slow crystallization rate is qualitatively characterized by the appearance of a cold crystallization peak upon the second heating in a typical DSC profile (thermogram), which indicates that the polymer could not complete the crystallization during the prior cooling under the normal cooling rate, e.g., ten degrees Celsius per minute (10° C./min). In some instances, the first cooling may take too long, which has an adverse effect on manufacturing and/or final product characteristics. The slow crystallization causes the high comonomer content propylene/α-olefin copolymer to be difficult to pelletize, and makes inventory storage extremely difficult due to pellet blocking tendencies. In addition, its slow crystallization rate also limits its usage in areas requiring fast crystallization or set up, such as fiber spinning. To observe a faster crystallization rate (and to enable pelletization and/or storage) the blending of ethylene copolymers or higher modulus propylene copolymers into these propylene comonomers has been proposed. However, these ethylene copolymers or higher modulus propylene copolymers provide no additional advantages with respect to nucleation of the high comonomer content propylene copolymer and often results in a stiffer than desired product.

Accordingly, effective nucleators to speed up the crystallization of this type of high comonomer content propylene-based interpolymers are sought.

SUMMARY

Embodiments may be realized by providing a composition that includes (A) 30-95 wt % of a random or homogeneous propylene-based interpolymer having: (i) a comonomer content of at least one of $C_2$ and $C_{4-10}$ α-olefins of 7 wt % to 49 wt % based on the total weight of the propylene-based interpolymer, (ii) a density of 0.90 g/cc or less, and (iii) an MFR of 1 g/10 min or greater (230° C./2.16 kg); and (B) 5-70 wt % of a block composite nucleator comprising: (1) a first polymer that includes polypropylene; (2) a second polymer that includes an alpha-olefin based polymer, the alpha-olefin being selected from at least one of a $C_2$ and $C_{4-10}$ α-olefins, and (3) a block copolymer having a first segment and a second segment, the first segment of the block copolymer having the same composition as the first polymer in the block composite nucleator and the second segment of the block copolymer having the same composition as the second polymer of the block composite nucleator. A process for nucleating a random or homogeneous propylene-based interpolymer includes the step of contacting the components of the composition under nucleating conditions.

BRIEF DESCRIPTION OF THE DRAWINGS

FIG. 1 is a set of two DSC profiles of a propylene/ethylene copolymer (Control 1). The first DSC profile is that of the second heating and the second DSC profile is that of the first cooling.

FIG. 2 is a set of two DSC profiles of Inventive Example 1, i.e., a blend of Control 1 of FIG. 1 and BCN1 in the Examples. The first DSC profile is that of the second heating and the second DSC profile is that of the first cooling.

FIG. 3 is a set of two DSC profiles of Inventive Example 2, i.e., a blend of Control 1 of FIG. 1 and BCN1 in the Examples. The first DSC profile is that of the second heating and the second DSC profile is that of the first cooling.

FIG. 4 is a set of two DSC profiles of Comparative Example A, i.e., a blend of Control 1 of FIG. 1 and Comparative CN1 in the Examples. The first DSC profile is that of the second heating and the second DSC profile is that of the first cooling FIG. 5 is a set of two DSC profiles of Comparative Example B, i.e., a blend of Control 1 of FIG. 1 and Comparative CN1 in the Examples. The first DSC profile is that of the second heating and the second DSC profile is that of the first cooling.

FIG. 6 is a set of two DSC profiles of Comparative Example C, i.e., a blend of a propylene/ethylene copolymer and AFFINITY™ PL 1280G. The first profile is that of the second heating and the second profile is that of the first cooling.

FIG. 7 is a set of two DSC profiles of Comparative Example D, i.e., a blend of a propylene/ethylene copolymer and DS6D82. The first profile is that of the second heating and the second profile is that of the first cooling.

FIG. 8 is a set of two DSC profiles of Comparative Example E, i.e., a blend of a propylene/ethylene copolymer and AFFINITY™ PL 1280G. The first profile is that of the second heating and the second profile is that of the first cooling.

FIG. 9 is a set of two DSC profiles of Comparative Example F, i.e., a propylene/ethylene copolymer and DS6D82. The first profile is that of the second heating and the second profile is that of the first cooling.

DETAILED DESCRIPTION

Figure 10:
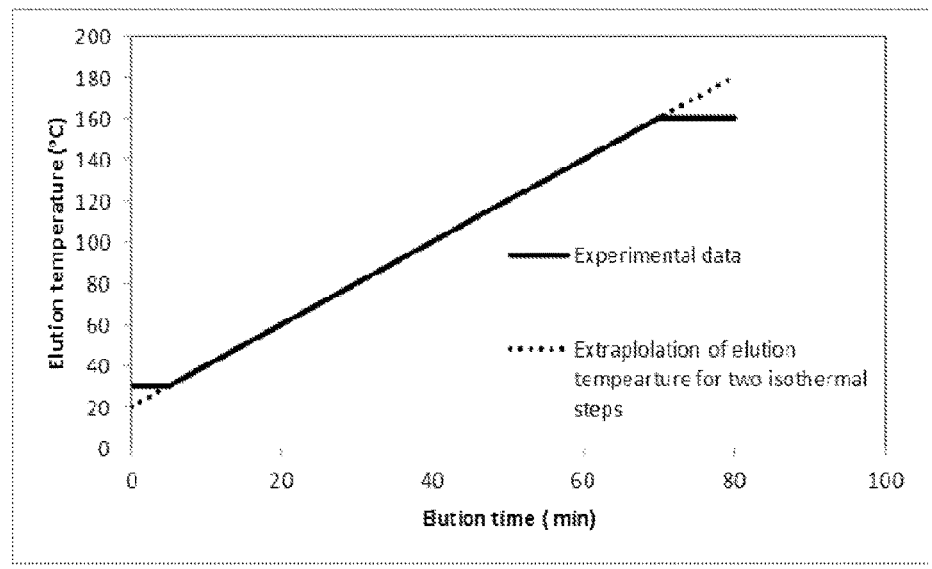
FIG. 10 is an extrapolation of the elution temperature for thermal gradient interaction chromatography temperature calibration.

Embodiments relate to a composition and process that includes the use of a block composite nucleator (BCN) as a nucleator for a high comonomer content random or homogeneous propylene-based interpolymer.

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the density and melt index of components of the compositions.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom.

"Composition" and like terms mean a mixture or blend of two or more components. For example, one composition is the combination of a random or homogeneous propylene-based interpolymer and a block composite nucleator.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/alpha-olefin polymer" and "propylene/alpha-olefin polymer" are indicative of interpolymers as described below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Mer unit" and like terms mean a repeat unit of a polymer. For example, —($CH_2CH_2$)— is a mer unit of an ethylene polymer, and the unit is derived from the monomer ethylene.

"Propylene-based polymer," and like terms mean a polymer that comprises a majority weight percent polymerized propylene monomer (based on the total amount of polymerizable monomers), and optionally comprises at least one polymerized comonomer different from propylene so as to form a propylene-based interpolymer. For example, when the propylene-based polymer is a copolymer, the amount of propylene is greater than 50 wt %, based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_{3-10}$ α-olefin. In contrast, "Ethylene-based polymer" and like terms mean a polymer that comprises a majority weight percent polymerized ethylene monomer (based on the total weight of polymerizable monomers), and optionally may comprise at least one polymerized comonomer different from ethylene so as to form an ethylene-based interpolymer. For example, when the ethylene-based polymer is a copolymer, the amount of ethylene is greater than 50 wt %, based on the total weight to the copolymer.

"Random propylene-based interpolymer" and like terms mean a propylene/α-olefin interpolymer in which the units derived from the α-olefin monomer are randomly distributed across the polymer chain, as opposed to distributed across the polymer chain in an alternating, periodic, or block pattern.

"Homogeneous propylene-based interpolymer" and like terms mean a propylene/α-olefin interpolymer in which the units derived from the α-olefin monomer are randomly and approximately evenly distributed across the polymer chains of the bulk polymer.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts (such as those described in the examples).

The term "block composite" (BC), e.g., a block composite nucleator (BCN), refers to polymers comprising a soft copolymer having a comonomer content (such one of a $C_2$ and $C_{4-10}$ α-olefin) that is greater than 10 mol % and less than 95 mol %, a hard polymer having a monomer content (such as ethylene), and a block copolymer (e.g., a diblock having a soft segment, and a hard segment), wherein the hard segment of the block copolymer is essentially the same composition as the hard polymer in the block composite and the soft segment of the block copolymer is essentially the same composition as the soft copolymer of the block composite.

The term "Hard" segments/blocks refer to crystalline/semicrystalline blocks of polymerized units. The term "Soft" segments/blocks refer to amorphous, substantially amorphous, or elastomeric blocks of polymerized units. The hard segments may be relatively harder than the soft segments.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" may refer to a monomer that can polymerize such that the resulting polymer is crystalline. Crystalline propylene polymers may have, but are not limited to, densities of 0.88 g/cc to 0.91 g/cc and melting points of 100° C. to 170° C.

The term "amorphous" may refer to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Propylene-Based Interpolymer

The amount of propylene-based interpolymer in the composition in from 10 wt % to 95 wt %, from 30 wt % to 95 wt %, from 30 wt % to 85 wt %, from 40 wt % to 85 wt %, and/or from 45 wt % to 80 wt %, based on the total weight of the composition. For example, the amount of the propylene-based interpolymer may at the lower end of the range from 10 wt % to 95 wt % when at least one of a tackifier, oil, and/or wax is included in the composition.

The random or homogeneous propylene-based interpolymers used include propylene interpolymers and reactor copolymers of polypropylene (RCPP), and comprise 7 or more wt % (10 or more mol %) of an alpha-olefin comonomer having at least one of 2 and 4 to 10 carbon atoms. For example, the alpha-olefin comonomer may be present in an amount from 7 wt % to 49 wt % (e.g., from 10 wt % to 40 wt %, from 10 wt % to 30 wt %, from 10 wt % to 20 wt %, from 10 wt % to 19 wt %, 10 wt % to 15 wt %, etc.), based on the total weight of the random or homogeneous propylene-based interpolymer. The random or homogeneous propylene-based interpolymers are distinguishable from block copolymers such as diblock copolymers. For example, the random or homogeneous propylene-based interpolymers may be made in a typically homogenous solution type polymerization process without the use of a chain shuttling agent, as discussed below with respect to the block composite nucleator.

For example, the propylene/alpha-olefin interpolymers may be further characterized as comprising (A) between 60 and less than 93 (e.g., between 80 and 99 and/or between 85 and 99) weight percent units derived from propylene, and (B) a remainder such as between 7 and 40 (e.g., between 1 and 20, between 1 and 15, and/or between 5 and 15) weight percent units derived from at least one of ethylene and/or a $C_{4-10}$ α-olefin (e.g., octene). In exemplary embodiments, the propylene/alpha-olefin interpolymers are propylene-ethylene copolymers. The propylene/alpha-olefin interpolymers may contain an average of at least 0.001 long chain branches/1000 total carbons.

Exemplary comonomers for polymerizing with propylene include ethylene, 1-butene, 1-pentene, 1-hexene, 1-heptene, 1-octene, 1-nonene, and 1-decene as well as 4-methyl-1-pentene, 4-methyl-1-hexene, 5-methyl-1-hexene, vinylcyclohexane, and styrene. For example, comonomers used include at least one of ethylene, 1-butene, 1-hexene, and 1-octene. For example, the random or homogeneous propylene-based copolymers include propylene with ethylene, 1-butene, 1-pentene, 1-hexene, 1-heptene, 1-octene, 1-nonene, 1-decene, or any combination thereof. Additional unsaturated comonomers include 1,3-pentadiene, norbornadiene, and dicyclopentadiene. For example, the alpha-olefin may be ethylene present in an amount from 7 wt % to 49 wt % (e.g., from 10 wt % to 40 wt %, from 10 wt % to 30 wt %, from 10 wt % to 20 wt %, from 10 wt % to 19 wt %, 10 wt % to 15 wt %, etc.), with the remainder being propylene.

The propylene based interpolymers of particular interest include, e.g., propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, and propylene/ethylene/1-octene. Exemplary propylene interpolymers are propylene/ethylene/1-butene, propylene/ethylene/1-hexene, and propylene/ethylene/1-octene.

Suitable polypropylenes are formed by means within the skill in the art, for example, using single site catalysts (metallocene or constrained geometry) or Ziegler Natta catalysts. Exemplary, polypropylene polymers include VERSIFY™ polymers (available from The Dow Chemical Company), KS 4005 polypropylene copolymer (previously available from Solvay); and KS 300 polypropylene terpolymer (previously available from Solvay). The propylene and comonomers, such as ethylene or alpha-olefin monomers may be polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98.

The propylene-based interpolymer have a melt flow rate (MFR) from 1 to 3000 g/10 min, in range of 1 to 1000 g/10 min, in the range of 1 to 500 g/10 min, in the range of 1 to 250 g/10 min, in the range of 1 to 200 g/10 min, in the range of 1 to 100 g/10 min, in the range of 1 to 50 g/10 min, in the range of 1 to 25 g/10 min, and/or in the range of 1 to 10 g/10 min, as measured in accordance with ASTM D-1238 at 230° C./2.16 kg. In exemplary embodiments, the MFR is 1 or more g/10 min. The MFR may be less than 10 g/10 min. The propylene-based interpolymer may have a Brookfield viscosity of greater than 50,000 centipoise (cP) (e.g., greater than 60,000 cP and/or greater than 100,000 cP) at 350° F./177° C. as measured using a Brookfield viscometer.

The propylene-based interpolymer has a density of 0.90 grams per cubic centimeter (g/cc) or less. For example, the density of the propylene-based copolymer is from 0.80 g/cc to 0.89 g/cc, from 0.82 g/cc to 0.89 g/cc, from 0.84 g/cc to 0.88 g/cc, from 0.84 g/cc to 0.87 g/cc, from 0.845 g/cc to 0.86 g/cc, and/or from 0.85 g/cc to less than 0.86 g/cc.

The propylene-based interpolymer may have a narrow molecular weight distribution (MWD), e.g., less than or equal to 4, or less than or equal to 3.5, less than or equal to 3, and/or less than or equal to 2.5. Propylene-based polymers of narrow MWD are formed by means within the skill in the art. Propylene-based polymers having a narrow MWD can be advantageously provided by visbreaking or by manufacturing reactor grades (non visbroken) using single-site catalysis, or by both methods.

The propylene/alpha-olefin interpolymer may have a melting temperature (Tm) typically of less than 120° C. and a heat of fusion (Hf) typically of less than 70 Joules per gram (J/g) as measured by differential scanning calorimetry (DSC) as described in U.S. Pat. No. 7,199,203.

The propylene-based interpolymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. For coupled or branched polypropylene, the ratio of subsequent MFR to initial MFR may be less than, or equal, to 0.7:1 and/or less than or equal to 0.2:1.

The propylene-based interpolymers may include propylene/alpha-olefin interpolymer (e.g., propylene/alpha-olefin copolymer), which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are known in the art and are described in, for example, U.S. Pat. No. 5,504,172 and International Publication No. WO 2000/001745, which refers to the isotactic sequence in terms of a triad unit in the copolymer molecular chain determined by $^{13}$C NMR spectra.

Exemplary propylene/alpha-olefin interpolymers are further described in the U.S. Pat. Nos. 8,609,228 and 6,525,157. Exemplary propylene/alpha-olefin interpolymers are commercially available from The Dow Chemical Company, under the trade name VERSIFY™, or from ExxonMobil Chemical Company, under the trade name VISTAMAXX™.

Block Composite Nucleator

The amount of block composite nucleator (BCN) in the composition is from 5 wt % to 70 wt %, from 10 wt % to 60 wt %, from 15 wt % to 55 wt %, and/or from 20 wt % to 55 wt %, based on the total weight of the composition. The ratio of the propylene-based interpolymer to block composite nucleator in the composition may be from 95:5 to 30:70, e.g., when the composition includes other optional components/additives the ratio may be from 95:5 to 30:70. For example, from 85:15 to 35:65, from 80:20 to 40:60, and/or from 76:24 to 49:51. For example, the ratio is approximately 1:1 to 3:1.

Block composite nucleator (BCN) refers to a block composite. The block composite comprises the soft polymer in which the comonomer content may be greater than 10 wt % and less than 95 wt % (based on the total weight of the soft copolymer), the hard polymer in which the monomer may be present in an amount greater than 80 wt % and up to 100 wt % (based on the total weigh of the hard polymer), and the block copolymer having a soft segment and a hard segment. With respect to the block copolymer, the hard segment of the block copolymer is essentially the same composition as the hard polymer in the block composite and the soft segment of the block copolymer is essentially the same composition as the soft copolymer of the block composite. As used herein, the soft polymer and the soft segment may be referred to as a first polymer and a first segment, respectively, and the hard polymer and the hard segment may be referred to as a second polymer and a second segment, respectively In the hard segments, the monomer may be present in an amount greater than 80 wt % (e.g., greater than 85 wt % and less than 100 wt %) with the remainder being the comonomer. In the soft segments, the comonomer content (in which the comonomer is different from the monomer) may be greater than 20 wt % and less than 100 wt % (e.g., greater than 50 wt % and less than 99 wt % and/or greater than 80 wt % and less than 99 wt %). For the block copolymers, a weight percentage of the soft segments may be greater than a weight percentage of the hard segments.

According to exemplary embodiments, the block composite nucleator includes a propylene-ethylene block composite nucleator comprising a block copolymer having 20-50 wt % and/or 25-45 wt % hard block, 50-80 wt % and/or 55-75 wt % soft block, with the hard block comprising 5-20 wt % (e.g., greater than 10 wt % and less than 20 wt %) units derived from propylene and remainder derived from ethylene and the soft block comprising 80-95 wt % units derived from propylene and remainder derived from ethylene (in addition to a propylene based polymer and an ethylene based polymer present with the block).

Block composite nucleators may be differentiated from conventional, random copolymers, and physical blends of polymers. The block composites nucleators may be differentiated from random copolymers and from a physical blend by characteristics such as microstructure index, better tensile strength, improved fracture strength, finer morphology, improved optics, and/or greater impact strength at lower temperature. For example, the block composite nucleators include a block copolymer having distinct regions or segments (referred to as "blocks") joined in a linear manner. The blocks differ, e.g., in the type of crystallinity such as polyethylene versus polypropylene. The block copolymers can be linear or branched. When produced in a continuous process, the block composites may possess PDI from 1.7 to 15 (e.g., from 1.8 to 10, from 1.8 to 5, and/or from 1.8 to 3.5). When produced in a batch or semi-batch process, the block composites may possess PDI from 1.0 to 2.9 (e.g., from 1.3 to 2.5, from 1.4 to 2.0, and/or from 1.4 to 1.8). Such block composites are described in, e.g., U.S. Patent Application Publication Nos. 2011-0313106, 2011-0313108, and 2011-0313108, all published on Dec. 22, 2011, incorporated herein by reference with respect to descriptions of the block composites, processes to make them, and methods of analyzing them.

The block composite nucleator may have a microstructure index greater than 1 and equal to or less than 20 (e.g., from 1.5 to 19.5 and/or from 1.75 to 19.5). The microstructure index is an estimation using solvent gradient interaction chromatography (SGIC) separation to differentiate between block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers.

The block composite nucleators may be are prepared by a process comprising contacting an addition polymerizable monomer or mixture of monomers under addition polymerization conditions with a composition comprising at least one addition polymerization catalyst, one or more cocatalyst (e.g., two cocatalysts), and a chain shuttling agent. The process may be characterized by formation of at least some of the growing polymer chains under differentiated process conditions in two or more reactors operating under steady state polymerization conditions or in two or more zones of a reactor operating under plug flow polymerization conditions.

Suitable processes useful in producing the block composites nucleator may be found, e.g., in U.S. Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

According to embodiments, the composition includes the block composite nucleator as a nucleating agent. The composition could optionally include another nucleating agent such as nucleating agents known in the art. According to exemplary embodiments, the composition may exclude any other nucleating agents (such as nucleating agents that are known in the art). For example, the composition may exclude nucleators such as carboxylic acid salts (including sodium benzoate), talc, phosphates, metallic-silicate hydrates, organic derivatives of dibenzylidene sorbitol, sorbitol acetals, organophosphate salts, and combinations thereof. In exemplary embodiments, the block composite nucleator may be the sole nucleating agent in the composition, e.g., in the composition that is a hot melt adhesive composition.

Additives and Fillers

The compositions may optionally include one or more additives and/or fillers. Nonlimiting examples of suitable additives include oils, waxes, tackifiers, plasticizers, thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, waxes, tackifiers, nucleating agents in addition to the block composite nucleators described above, flame retardants and combinations thereof. Nonlimiting examples of fillers include fumed silica, precipitated silica, talc, calcium carbonates, carbon black, aluminosilicates, clay, zeolites, ceramics, mica, titanium dioxide, and combinations thereof. The type and amount of additives and/or filler is selected to maximize the manufacture, storage, use and/or economics of the composition.

If included, the wax and/or oil may be used to reduce the melt viscosity of the composition. Non-limiting examples of waxes include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. Non-limiting examples of oils include mineral based oils, petroleum based oils, functionalized oils such as glycerol trihydroxyoleate, vegetable oils, fatty oils, other plasticizing oils known in the art, and mixtures thereof. Exemplary oils are hydrocarbon oils that are low in aromatic content and are paraffinic or naphthenic in character.

If included, the tackifier may modify the properties of the composition such as viscoelastic properties (e.g., tan delta), rheological properties (e.g., viscosity), tackiness (e.g., ability to stick), pressure sensitivity, and wetting property. In some embodiments, the tackifier may be used to improve the tackiness of the composition. In other embodiments, the tackifier may be used to reduce the viscosity of the composition. In particular embodiments, the tackifier is used to wet out adherent surfaces and/or improve the adhesion to the adherent surfaces. The tackifier may have a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C.

Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. In an embodiment the tackifying agent is free of groups with which the silanol group of either the silane-grafted amorphous polyalpha-olefin or the silane-grafted ethylene/α-olefin multi-block copolymer will react.

The composition may include a plasticizer (e.g., that is the same as or different from an oil). The plasticizer may be an organic composition that can be added to improve extrudability, flexibility, workability, and/or stretchability. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils, which are low in aromatic content and which are paraffinic or napthenic in character. Plasticizer oils may be low in volatility, may be transparent, and may have as little color and odor as possible. Other exemplary plasticizers include olefin oligomers, low molecular weight polymers, vegetable oils and their derivatives, and similar plasticizing liquids.

Compositions

In exemplary embodiments, the composition includes (A) 30-95 wt %, 40-85, and/or 45-80, wt % of a random or homogeneous propylene-based copolymer having at least one of (i) a $C_2$ or $C_{4-10}$ α-olefin comonomer content of 7 or more wt %, 10 or more wt %, and/or 12 or more wt %, (ii) an MWD of 4 or less, 3.5 or less, and/or 3 or less, (iii) a density of 0.90 g/cc or less, 0.895 g/cc or less, and/or 0.89 g/cc or less, and (iv) an MFR of 1 g/10 min or greater (230° C./2.16 kg); and (B) 5-70 wt %, 10-60 wt %, and/or 20-55 wt % of a block composite nucleator having at least one of the following properties: (1) 5-92 wt %, 25-70 wt %, and/or 34-60 wt %, units derived from ethylene and the remainder derived from a $C_{3-10}$ α-olefin; (2) a microstructure index greater than 1 and equal to or less than 20 (e.g., from 1.5 to 19.5 and/or from 1.75 to 19.5; and (3) A DSC peak melting point of at least 85° C., of at least 100° C., and/or of at least 115° C.

The composition may be a hot melt adhesive (HMA). The HMA composition may include (in addition to the random or homogeneous propylene-based copolymer and the block composite nucleator) from 0 to 70 wt % of at least one tackifier, based on the total weight of the HMA composition. For example, the amount of the tackifier (when included) may be from 5 wt % to 70 wt %, from 10 wt % to 50 wt %, from 20 wt % to 40 wt %, and/or from 30 wt % to 40 wt %, based on the total weight of the HMA composition. In an exemplary embodiment, the HMA composition includes from 30 wt % to 40 wt % of a tackifying resin. The HMA composition may include from 0 to 40 wt % of a wax and/or oil (such a combined weight of wax and/or oil is from 0 to 40 wt %). For example, the amount of the wax and/or (when included) may be from 5 wt % to 40 wt %, from 10 wt % to 35 wt %, from 15 wt % to 30 wt %, and/or from 20 wt % to 30 wt %, based on the total weight of the HMA composition. In an exemplary embodiment, the HMA composition includes from 20 wt % to 30 wt % of a wax. The HMA composition may include from 0 wt % to 5 wt % of other additives, such as an antioxidant. For example, the HMA composition may include from 0.1 wt % to 2 wt % of an antioxidant.

The HMAs are adhesives that are applied as a melt onto the parts to be adhesively bonded and cure as they cool and solidify. The HMA compositions may exclude a solvent so as to be a non-solved based adhesive. The HMA compositions may be block composite based high melt viscosity and high melt flow index adhesive compositions.

The compositions may be melt blended and used in the same manner as known compositions. Melt blending of the composition may be effected by standard means known to those skilled in the art. Examples of melt blending equipment are internal batch mixers, such as a BANBURY™ or BOLLING™ internal mixer. Other examples are continuous single or twin screw mixers that can be used, such as a FARREL™ continuous mixer, a COPERION™ twin screw mixer, or a BUSS™ kneading continuous extruder. The components may be mixed at a temperature and for a length of time sufficient to effectively homogenize the mixture. The type of mixer utilized, and the operating conditions of the mixer, may have an effect on properties of the composition such as viscosity, volume resistivity, and/or extruded surface smoothness. The process may reduce the melt viscosity of the melt blended composition from 10% to 40%.

In an embodiment, the homogenization step includes subjecting the melt blend to high pressure homogenization. High pressure homogenization utilizes a high pressure homogenizer. A "high pressure homogenizer," (or HPH) as used herein, is a device that applies at least 100 bar hydrostatic pressure to a fluid substance and subsequently imposes a restricted flow to the fluid.

HPH includes placing the propylene-based interpolymer and the block composite nucleator in a melt state (polymer melt) or in an otherwise flowable state. A pressure pump delivers the polymer melt to a valve area of the HPH under high pressure (e.g., from 100 bar to 2000 bar). In the valve area, a homogenization gap may be present between a valve seat and a valve. The homogenization gap is a minute space between the valve seat and the valve. As the polymer melt flows through and exits the homogenization gap, a rapid increase in velocity may occur simultaneously with a rapid decrease in pressure. The intense energy release at the homogenization gap may cause turbulence and localized pressure, breaking the individual chains of the olefin-based polymer. An impact ring may or may not be directly downstream from the homogenization gap. Impingement of the polymer melt with the impact ring imparts further turbulence to the polymer melt exiting the homogenization gap. Bounded by no particular theory, it is believed one, some, or all of the following phenomena occur in the HPH and contribute to the viscosity reduction of the polymer melt: high hydrostatic pressure, shear stress, cavitation, turbulence, impingement, and temperature increase.

In an embodiment, the HPH reduces the melt viscosity of the polymer melt from 10%, or 15%, or 20%, or 25% to 30% or 35% or 40%. The reduction in melt viscosity is based on the initial melt viscosity of the polymer melt prior to homogenization. The reduced-viscosity polymer melt continues through a channel of the HPH for movement to the next processing stage. In an embodiment, the HPH is a two-stage high pressure homogenizer. The first-stage includes the pressure pump and valve area as described above. The second stage includes a second pressure pump and a second valve area that utilizes from 10% to 20% less pressure than the first stage in order to reduce cavitation and increase turbulent flow.

In an embodiment, the process includes introducing a polymer melt having a melt viscosity from 2500 cP to 20,000 cP into a high pressure homogenizer. The process includes subjecting the polymer melt to high pressure homogenization and forming a polymer melt with a melt viscosity from 1500 cP to 12,000 cP. In an embodiment, the process includes introducing a formulated hot polymer melt composition having a melt viscosity from 800 cP to 3500 cP into a high pressure homogenizer. The process includes subjecting the formulated hot polymer melt composition to high pressure homogenization and forming a hot polymer melt composition having a melt viscosity from 480 cP to 2100 cP.

Nucleation Process

Controlling the nucleation and crystallization rates during melt processing of high comonomer content random or homogeneous propylene-based interpolymer is important in determining the physical properties of the finished article. It is believed that the block composite nucleator according to embodiments provides is differentiable from various methods of controlling nucleation and crystallization that incorporate the use of nucleating agents that are typically finely divided particles and have a melting and freezing temperature greater than that of the polymer in which the particles are utilized (while the chemical nucleating agents are primarily combinations of acidic and basic compounds such as organic or inorganic compounds) and can detrimentally affect the physical properties of a final product (e.g., by lowering the tensile strength).

The block composite nucleator may modify the crystalline structure of high comonomer content random or homogeneous propylene-based interpolymer. It is believed, the block composite nucleator may alter the physical properties of the high comonomer content random or homogeneous propylene-based interpolymer to nucleate the formation of crystals based on large crystal structures known as spherulites being formed upon cooling of the polymers to a point below their crystalline freezing point. The addition of nucleating agents typically results in the formation of a crystal structure that is substantially free of large spherulites (which are large crystal structures typically formed upon cooling of polymers to a point below their crystalline freezing point). This results in a high comonomer content random or homogeneous propylene-based interpolymer with physical properties that are better suited for certain applications. For example, the resultant polymers may have greater transparency (which is desirable in many film applications) and/or increased flexural modulus or stiffness.

An exemplary embodiment includes a process for nucleating a high comonomer content random or homogeneous propylene-based interpolymer, the process comprising the step of contacting under nucleating conditions the propylene based interpolymer and the block composite nucleator. The block composite nucleator has a first polymer that includes polypropylene, a second polymer that includes an alpha-olefin based polymer (the alpha-olefin being selected from at least one of a $C_2$ and $C_{4-10}$ α-olefins), and a block copolymer having a first segment and a second segment, the first segment of the block copolymer having the same composition as the first polymer in the block composite nucleator and the second segment of the block copolymer having the same composition as the second polymer of the block composite nucleator. The block copolymer may have 10-90 wt % of a hard block comprising 80 or more wt % derived from ethylene, and 10-90 wt % of a soft block comprising 80 or more wt % units derived from propylene. In exemplary embodiments, the block copolymer has 20-50 wt % (e.g., 25-45 wt %, etc.) of a hard block comprising 80 or more wt % derived from ethylene, and 50-80 wt % (e.g., 55-75 wt %, etc.) of a soft block comprising 80 or more wt % units derived from propylene. The phrase "under nucleating conditions" means a temperature at which the random or homogeneous propylene/α-olefin copolymer will form crystals when in contact with the block composite nucleator, as would be understood by a person of ordinary skill in the art.

In exemplary embodiments, the nucleating conditions include a temperature from greater than (>) the glass transition temperature (Tg) of the random or homogeneous propylene-based copolymer to less than (<) the melting temperature (Tm as determined by DSC) of the random or homogeneous propylene-based copolymer. For example, the nucleating conditions include temperature from 5° C. greater than (>) the glass transition temperature (Tg) of the random or homogeneous propylene-based copolymer to 10° C. less than (<) the melting temperature (Tm as determined by DSC) of the random or homogeneous propylene-based copolymer. Contacting the random or homogeneous propylene/α-olefin copolymer with the block composite nucleator can be conducted using convention equipment and conventional techniques with (preferred) or without agitation, extended contact times, metering of the nucleator into the copolymer or vice versa, etc. For example, the contact is accomplished prior to a pelletization step.

In exemplary embodiments, the random or homogeneous propylene-based interpolymer is brought in combination with the block composite nucleator (e.g., nucleating agent) before, during, and/or after the on the onset of crystallization. The resultant composition may be used in a fabricated article, e.g., film, sheet, foam, fiber, pouches, injection molded, extruded calendared and the like. Improvements such as increase related to barrier properties (such as related to water vapor, moisture, and/or oxygen), reduction of shrinkage along specific directions as an "in plane" crystalline structure is realized, improved dimensional stability in parts, and/or growth in a flow machine direction of an article, may be realized when forming a nucleated article such as a nucleated propylene based film.

In exemplary embodiments, the block composite nucleator may be used in compositions for forming articles using, e.g., extrusion, extrusion blow molding, extrusion case film, extrusion compression molding, extrusion coating, film extrusion, sheet extrusion, injection molding, rotomolding, thermoforming, and/or thin-wall injection molding. Exemplary applications include pipes, caps and closures, extruded tubes, blown films, extrusion blow molding articles such as bottles, and/or fibers (such as non-woven and monofilament).

EXAMPLES

Test Methods

Density is measured in accordance with ASTM D-792. The result is reported in gamma (g) per cubic centimeter, or g/cc.

Melt Index ($I_2$) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg). The result is reported in grams/10 minutes.

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melting Temperature of Homopolymer Polypropylene measurement uses DSC to determine the melting point. The temperature at the maximum heat flow rate with respect to a linear baseline is used as the melting point. The linear baseline is constructed from the beginning of the melting (above the glass transition temperature) and to the end of the melting peak. The temperature is raised from room temperature to 200° C. at 10° C./min, maintained at 200° C. for 5 min, decreased to 0° C. at 10° C./min, maintained at 0° C. for 5 min and then the temperature is raised from 0° C. to 200° C. at 10° C./min, and the data are taken from this second heating cycle.

High Temperature Thermal Gradient Interaction Chromatography measurement uses a commercial Crystallization Elution Fractionation instrument (CEF) (Polymer Char, Spain) is used to perform high temperature thermal gradient interaction chromatography (HT-TGIC, or TGIC) measurement (Cong, et al., Macromolecules, 2011, 44 (8), 3062-3072). A single Hypercarb column (100×4.6 mm, Part#35005-104646, Thermo Scientific) is used for separation. A "¼ inch×³⁄₁₆ inch ID" stainless steel column with a length of 3 inches packed with 27 micron glass beads (Catalog# GL01918/20-27 um, MO-SCI Specialty Products, LLC, Rolla, Mo., USA), is installed in front of the IR detector, in the top oven of the CEF instrument. The experimental parameters are: top oven/transfer line/needle temperature at 150° C., dissolution temperature at 160° C., dissolution stirring setting of 2, sample loading volume of 0.400 mL, pump stabilization time of 15 seconds, a pump flow rate of cleaning column at 0.500 mL/m, pump flow rate of column loading at 0.300 ml/min, stabilization temperature at 150° C., stabilization time (pre, prior to load to column) at 3.0 min, stabilization time (post, after loaded to column) at 1.0 min, SF (Soluble Fraction) time at 5.0 min, cooling rate of 3.00° C./min from 150° C. to 30° C., flow rate during cooling process of 0.00 ml/min, heating rate of 2.00° C./min from 30° C. to 150° C., isothermal time at 150° C. for 15 min, elution flow rate of 0.500 mL/min, and an injection loop size of 140 microliters.

The flow rate during cooling process can be adjusted according to the length of graphite column where all the polymer fractions must remain on the column at the end of cooling cycle.

Samples are prepared by the PolymerChar autosampler at 160° C., for 120 minutes, at a concentration of 4.0 mg/ml in ODCB (defined below). Silica gel 40 (particle size 0.2~0.5 mm, catalogue number 10181-3, EMD) is dried in a vacuum oven at 160° C., for about two hours, prior to use. 2,6-di-tert-butyl-4-methylphenol (1.6 grams, BHT, catalog number B1378-500G, Sigma-Aldrich) and the silica gel 40 (5.0 grams) are added to two liters of ortho-dichlorobenze (ODCB, 99% anhydrous grade, Sigma-Aldrich). This "ODCB containing BHT and silica gel" is now referred to as "ODCB." This ODCB is sparged with dried nitrogen ($N_2$) for one hour prior to use.

The TGIC data is processed on a PolymerChar (Spain) "GPC One" software platform. The temperature calibration is performed with a mixture of about 4 to 6 mg Eicosane, 14.0 mg of isotactic homopolymer polypropylene iPP (polydispersity of 3.6 to 4.0, and molecular weight Mw reported as polyethylene equivalent of 150,000 to 190,000 Daltons, and polydispersity (Mw/Mn) of 3.6 to 4.0, and a DSC melting temperature at 158-159C with the specified method below), and 14.0 mg of homopolymer polyethylene HDPE (zero comonomer content, Mw reported as polyethylene equivalent as 115,000 to 125,000 Daltons, and polydispersity of 2.5 to 2.8), in a 10 mL vial filled with 7.0 mL of ODCB. The dissolution time is 2 hours at 160° C.

The calibration process (30° C. to 150° C. for Eicosane elution and HDPE elution) consists of the following steps:

(1) Extrapolate the eluting temperature for each of the isothermal steps during elution according to heating rate (demonstrated in FIG. 10).

(2) Calculate the delay volume: Shift the temperature (x-axis) corresponding to the IR measurement channel chromatogram (y-axis), so that the Eicosane peak maximum (y-axis) is coincident with elution temperature at 30.0° C. The delay volume is calculated from the temperature difference (30° C.—the actual elution temperature of Eicosane peak maximum) divided by the heating rate of the method, and then multiplied by the elution flow rate.

(3) Adjust each recorded elution temperature with this same delay volume adjustment.

(4) Linearly scale the heating rate, such that the observed HDPE reference has an elution peak maximum temperature of 150.0° C., while the Eicosane elution peak maximum temperature remains at 30.0° C.

(5) The peak temperature of the polypropylene will be observed within the range of 119.3-120.2° C., which is a validation of the calibration method.

Data processing for polymer samples of TGIC is described below.

A solvent blank (ODCB from solvent resevior) is run at the same experimental conditions as the polymer samples. Data processing for polymer samples includes: subtraction of the solvent blank for each detector channel, temperature extrapolation as described in the calibration process, compensation of temperature with the delay volume determined from the calibration process, and adjustment in elution temperature axis to the 30° C. and 150° C. range as calculated from the heating rate of the calibration.

The chromatogram (measurement channel of IR-4 detector) is integrated with PolymerChar "GPC One" software. A straight baseline is drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit is established based on the visible difference when the peak falls to the flat baseline region (roughly a zero value in the blank subtracted chromatogram). The lower temperature integration limit is established based on the intersection point of the baseline with the chromatogram including the soluble fraction.

The soluble fraction (SF) is defined as the weight percentage of the material eluting including and below 34.0° C.

Materials eluting as soluble fraction % =

$$100 \times \frac{\int_{lower\ temperature\ intergation\ limit}^{34.0} IR - 4dT}{\int_{lower\ temperature\ intergation\ limit}^{Upper\ temperature\ intergation\ limit} IR - 4dT}$$

High Temperature Liquid Chromatography (HTLC) measurement: HTLC experiment is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-μL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 μm particle size) is connected between the injector and a 10-port VICI valve (Houston, Tex., USA). The valve is equipped with two 60-μL sample loops. The valve is used to continuously sample eluent from the first dimension (D1) HTLC column to the second dimension (D2) SEC column. The pump of Waters GPCV2000 and a PLgel Rapid™-M column (10×100 mm, 5 μm particle size) are connected to the VICI valve for D2 size exclusion chromatography (SEC). The symmetric configuration is used for the connections as described in the literature (van der Horst, A.; Schoenmakers, P. J. *J. Chromatogr. A.* 2003, 1000, 693). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC

Approximately 25 mg are dissolved in 8-mL decane by gently shaking the vial at 160° C. for 2 hours. The decane contains 400 ppm BHT (2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-μL aliquot of sample solution is injected into the HTLC column. The injection triggers the gradient described below:

From 0-10 min, 100% decane/0% TCB;
From 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC

The 651 min raw chromatogram is first folded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$X_n$ = elution volume (mL) = D1 flow rate × n × $t_{switch}$ where $t_{switch}$ = 3 min is the switch time of the 10-port VICI valve.

$$Y_n = \text{signal intensity (Voltage)} = \sum_{peak\ start}^{peak\ end} IR_{measure,i}$$

where $IR_{measure,i}$ represents data point i in the D2 SEC chromatogram.

The above equation uses $IR_{measure}$ signal as the example. The obtained HTLC chromatogram shows the concentrations of the separated polymeric components as a function of elution volume. The normalized $IR_{measure}$ HTLC chromatogram is shown in, e.g., FIG. 11, with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of $LS15/IR_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by SEC as 104.2 kg/mol with LS and RI (refractive index) detectors. SEC uses NBS 1475 as the standard. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure}M_w}$$

The experimental $LS15/IR_{measure}$ ratio is then converted to $M_w$ through $\Omega$.

Figure 11:
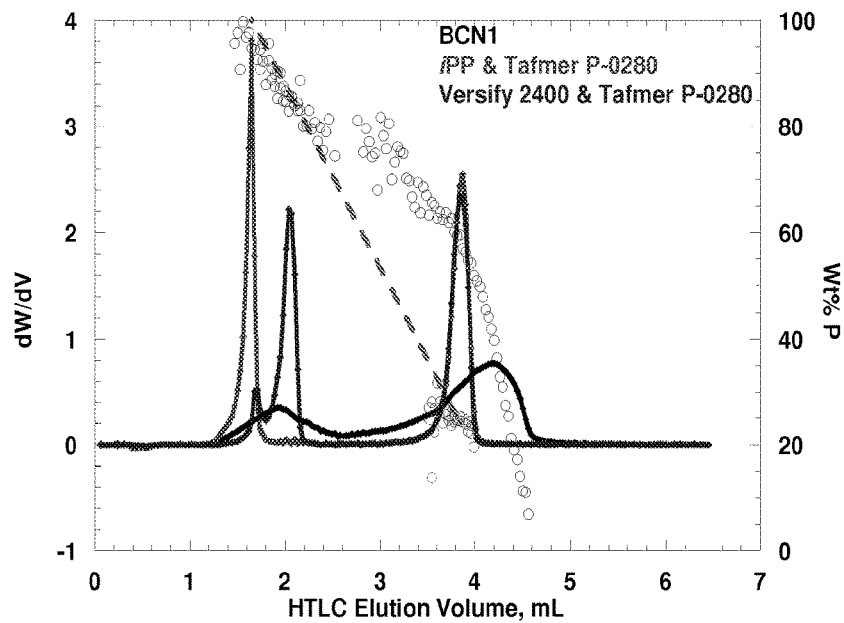
FIG. 11 reports high temperature liquid chromatography (HTLC) chromatograms of Comparative BCN1, a blend of iPP with TAFMER™ P0280, and a blend of VERSIFY™ 2400 with TAFMER™ P0280. The dashed line is a linear regression fit of chemical compositions of iPP, VERSIFY™ 2400 (main peak), and TAFMER™ P0280 versus their elution volumes.

Microstructure Index Estimation: Referring to the HTLC experiment, in adsorption based solvent gradient interaction chromatography (SGIC) separation of polymer, block copolymer is eluted later than the random copolymer of the same chemical composition (Brun, Y.; Foster, P. *J. Sep. Sci.* 2010, 33, 3501). In particular, the material used for the microstructure index estimation is separated into two fractions, i.e., a random copolymer and a block copolymer of the same chemical composition. The early eluting fraction, i.e., the first fraction, indicates the comparatively higher presence of random copolymers. The late eluting component, i.e., the second fraction, indicates the comparatively higher presence of block copolymers. The microstructure index is defined as:

$$\text{Microstructure Index} = \frac{1}{\sum_{\text{peak start of component 1}}^{\text{peak end of component 2}} w_n \frac{Comp_{n,random}}{Comp_{n,sample}}}$$

where $w_n$ is weight fraction of fraction n. and $Comp_{n,random}$ is the chemical composition (wt % P) of fraction n derived from the linear calibration curve (Dashed line in FIG. 11). The curve reaches 0 wt % P at 4.56 mL and 100 wt % P at 1.65 mL. The compositions beyond 4.56 mL are considered to be 0 wt % P. The compositions before 1.65 mL are considered to be 100 wt % P. $Comp_{n,sample}$ is the chemical composition (wt % P) of fraction n measured from the sample (such as the sample of the claimed material).

By way of example, three HTLC chromatograms are shown in FIG. 11. The chromatogram having lower peaks around 2.0 and 4.2 is for Comparative BCN1 (i.e., CBCN1). The chromatogram having peaks around 1.5 and 3.9 is for the blend of iPP and TAFMER™ P-0280 (an ethylene/alpha-olefin copolymer product available from Mitsui Chemicals). The chromatogram having peaks around 2.0 and 3.9 is for the blend of VERSIFY™ 2400 (a propylene-ethylene copolymer available from The Dow Chemical Company) and TAFMER™ P-0280. The dashed line is a linear regression fit of the chemical compositions of iPP, VERSIFY™ 2400, and TAFMER™ P-0280 versus their peak elution volumes. Note that VERSIFY™ 2400 has two peaks. The composition and elution volume of the main peak is used for the linear fit. The three polymers all have $M_w$ above 80,000 Daltons.

Materials for Composite Formation

Catalyst-1 ([[rel-2',2'''-[(1R,2R)-1,2-cylcohexanediylbis (methyleneoxy-κO)] bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification.

CSA-1 (diethylzinc or DEZ) and Cocatalyst-2 (modified methylalumoxane (MMAO)) were purchased from Akzo Nobel and used without further purification.

The Solvent for the polymerization reactions is a hydrocarbon mixture (ISOPAR®E) obtainable from ExxonMobil Chemical Company and purified through beds of 13-X molecular sieves prior to use.

Block Composite Nucleator 1 (BCN1) and Comparative Composite Nucleator 1 (CCN1) are prepared using two continuous stirred tank reactors (CSTR) connected in series (in a solution pilot facility). Each reactor is hydraulically full and set to operate at steady state conditions. Monomers, Solvent, Catalyst-1, Cocatalyst-1, Cocatalyst-2, and CSA-1 are flowed to the first reactor according to the process conditions outlined in Tables 1 and 2. Then, the first reactor contents as described in Tables 1 and 2 are flowed to a second reactor in series. Additional Catalyst, Cocatalyst-1, and Cocatalyst-2 are added to the second reactor.

TABLE 1

Process Conditions for BCN1

| Condition | 1st reactor | 2nd reactor |
|---|---|---|
| Reactor Control Temp. (° C.) | 140.00 | 115.54 |
| Solvent Feed (lb/hr) | 144.28 | 359.67 |
| Propylene Feed (lb/hr) | 3.73 | 60.27 |
| Ethylene Feed (lb/hr) | 27.98 | 10.17 |
| Reactor Propylene Conc. (g/L) | 1.95 | 1.97 |
| Hydrogen Feed (SCCM) | 9.61 | 9.61 |
| Catalyst Flow (lb/hr) | 0.8 | 0.5 |
| Catalyst Conc. (ppm) | 150.03 | 500.02 |
| Cocatalyst-1 Flow (lb/hr) | 0.81 | 0.31 |
| Cocatalyst-1 Conc. (ppm) | 199.94 | 7999.51 |
| Cocatalyst-2 Flow (lb/hr) | 1.43 | 0.31 |
| Cocatalyst-2 Conc. (ppm) | 195.31 | 14.97 |
| DEZ Flow (lb/hr) | 1.50 | — |
| DEZ Concentration (ppm) | 4496.93 | — |

TABLE 2

Process Conditions for CCN1

| Condition | 1st reactor | 2nd reactor |
|---|---|---|
| Reactor Control Temp. (° C.) | 115.06 | 115.09 |
| Solvent Feed (lb/hr) | 389.88 | 114.55 |
| Propylene Feed (lb/hr) | 70.01 | 21.02 |
| Ethylene Feed (lb/hr) | 10.52 | 0 |
| Reactor Propylene Conc. (g/L) | 2.33 | 2.05 |
| Hydrogen Feed (sccm) | 9.62 | 9.61 |
| Catalyst Flow (lb/hr) | 1.2 | 0.5 |
| Catalyst Conc. (ppm) | 49.93 | 500.02 |
| Cocatalyst-1 Flow (lb/hr) | 1.61 | 0.31 |

TABLE 2-continued

Process Conditions for CCN1

| Condition | 1st reactor | 2nd reactor |
|---|---|---|
| Cocatalyst-1 Conc. (ppm) | 499.98 | 7999.51 |
| Cocatalyst-2 Flow (lb/hr) | 0.8 | 0.31 |
| Cocatalyst-2 Conc. (ppm) | 1992.61 | 1797.31 |
| DEZ Flow (lb/hr) | 1.29 | — |
| DEZ Concentration (ppm) | 29986.88 | — |

Referring to the above, BCN1 includes a propylene-ethylene block composite nucleator comprising a block copolymer having 30 wt % hard block and 70 wt % soft block, with the hard block comprising 91 wt % units derived from ethylene and with the soft block comprising 15 wt % units derived from ethylene (in addition to a propylene based polymer and an ethylene based polymer also present in the BCN1). CCN1 is a propylene-ethylene composite nucleator comprising 80 wt % soft polymer and 20 wt % hard polymer, with soft polymer comprising 14 wt % ethylene.

Measured properties of the resultant BCN1 and CCN1 (comparative), are shown in Table 3, below.

TABLE 3

Properties for BCN1 and CCN1

| Example | MFR (230° C./2.16 kg) | Mw Kg/mol | Mw/Mn | Total Wt % $C_2$ | Tm (° C.) Peak 1 (Peak 2) | Tc (° C.) | Melt Enthalpy (J/g) | Tg (° C.) |
|---|---|---|---|---|---|---|---|---|
| BCN1 | 17 | 105,730 | 2.59 | 37.7 | 102 | 80 | 41.9 | −31 |
| CCN1 | 21 | 158,040 | 2.56 | 10.8 | 139 | 71 | 27.6 | −29 |

The concentration, composition, and $M_w$ of the two components separated via HTCL in BCN1 are shown in Table 4, below. The calculated microstructure index is determined for BCN1 to be 1.8, indicating the block composite nucleator is a more "blocky" material than the comparative polyolefin elastomer used to determine the Microstructure Index.

TABLE 4

HTLC characterization of BCN1*

| | Composition Peak 1: wt % P > 70 | | | Composition Peak 2: wt. % P < 70 | | | |
|---|---|---|---|---|---|---|---|
| Example | Concentration wt % | Composition wt % P | $M_w$ Kg/mol | Concentration Wt % | Composition Wt % P | $M_w$ kg/mol | Microstructure index |
| BCN1 | 25.4 | 87.8 | 72.4 | 74.6 | 49.0 | 131 | 1.8 |

*Microstructure Index of CCN1 could not be determined

Materials for Propylene-based Copolymer Formation

For the examples, a propylene/ethylene copolymer (P/E) (also referred to as Control 1) is prepared using a single stirred tank reactor. The reactor is hydraulically full and set to operate at steady state conditions. Monomers, Solvent, Catalyst-1, Cocatalyst-1, Cocatalyst-2, and hydrogen are flowed to the reactor according to the process conditions outlined in Table 5, below.

TABLE 5

Process Conditions for Control 1

| Condition | 1st reactor |
|---|---|
| Reactor Control Temp. (° C.) | 125 |
| Solvent Feed (lb/hr) | 952 |

TABLE 5-continued

Process Conditions for Control 1

| Condition | 1st reactor |
|---|---|
| Propylene Feed (lb/hr) | 239 |
| Ethylene Feed (lb/hr) | 34.5 |
| Reactor Propylene Conc. (g/L) | 36.8 |
| Hydrogen Feed (SCCM) | 1634 |
| Catalyst Flow (lb/hr) | 0.8 |
| Catalyst Conc. (ppm) | 39.9 |
| Cocatalyst-1 Flow (lb/hr) | 0.6 |
| Cocatalyst-1 Conc. (ppm) | 397 |
| Cocatalyst-2 Flow (lb/hr) | 0.4 |
| Cocatalyst-2 Conc. (ppm) | 397 |
| DEZ Flow (lb/hr) | 0 |
| DEZ Concentration (ppm) | 0 |

Measured properties of P/E (Control 1) are the following:

(1) wt % Comonomer (i.e., Ethylene): 14 wt %

(2) Density: 0.858 g/cc (3) Melt Flow Rate (MFR) of 2 g/10 min (230° C./2.16 kg)

Materials for Exemplary Blends

Irganox® 1010 (AO1) is pentaerythritol tetrakis(3-(3,5-di-tert-butyl-4-hydroxyphenyl)propionate) based antioxidant, and is available from BASF Chemical.

TABLE 6

Example Blends

| | Control 1 (wt %) | BCN1 (wt %) | CCN1 (wt %) | AO1 (wt %) |
|---|---|---|---|---|
| Inventive 1 | 49.9 | 49.9 | — | 0.2 |
| Inventive 2 | 74.9 | 24.9 | — | 0.2 |
| Comparative A | 49.9 | — | 49.9 | 0.2 |
| Comparative B | 74.9 | — | 24.9 | 0.2 |

The materials required for these blends are weighed on a Mettler-Toledo AT201 model lab balance. In order to achieve a uniform dispersion and distribution of the formulations, a HAAKE™ drive model rs5000 rheometer equipped with a small bowl (~50 g capacity) is used. The bowl is heated to 177° C. and mixed at 70 RPM for 5 minutes. Irganox® 1010 is added after all of the solid materials have achieved a melted state.

Referring to Table 7 below and FIGS. 1-5, the Control 1 sample does not undergo any measurable crystallization as seen in its cooling curve. This is further supported by a very prominent secondary cooling peak observed during the DSC second heating of Control 1.

DS6D82 is a random polypropylene copolymer having 6 wt % ethylene with a melt index of 8 g/10 min (190° C./2.16 kg), a density of 0.900 g/cc, and is available from Braskem.

For Comparative Examples C, D, E, and F, P/E copolymers are prepared using a single stirred tank reactor. The reactor is hydraulically full and set to operate at steady state conditions. The process conditions for Comparative Examples C to F are reported in Table 8. In particular, monomers, Solvent, Catalyst-1, Cocatalyst-1, Cocatalsyt-2, and hydrogen are flowed to the reactor according to the process conditions outlined in Table 8, below.

TABLE 8

Reactor Conditions for Comparative Examples C to F

| Condition, Single Reactor | Comparative C | Comparative D | Comparative E | Comparative F |
|---|---|---|---|---|
| Reactor Control Temp. (° C.) | 130 | 130 | 130 | 120 |
| Solvent Feed (lb/hr) | 1032 | 1031 | 1003 | 1014 |
| Propylene Feed (lb/hr) | 189 | 188 | 181 | 191 |
| Ethylene Feed (lb/hr) | 34.1 | 34.2 | 31.8 | 34.6 |
| Reactor Propylene Conc. (g/L) | 27.7 | 27.2 | 4.82 | 27.2 |
| Hydrogen Feed (SCCM) | 2104 | 2091 | 2341 | 2467 |
| Catalyst Flow (lb/hr) | 0.35 | 0.29 | 0.56 | 0.49 |
| Catalyst Conc. (ppm) | 120 | 120 | 120 | 40 |
| Cocatalyst-1 Flow (lb/hr) | *NM | *NM | 0.41 | 0.83 |
| Cocatalyst-1 Conc. (ppm) | 1200 | 1200 | 1200 | 195 |
| Cocatalyst-2 Flow (lb/hr) | *NM | *NM | 0.48 | 0.34 |
| Cocatalyst -2 Conc. (ppm) | 600 | 600 | 745 | 300 |
| DEZ Flow (lb/hr) | 0 | 0 | 0 | 0 |
| DEZ Concentration (ppm) | 0 | 0 | 0 | 0 |

*NM = Not Measured

TABLE 7

DSC Analysis of Table 6 Blends

| | First Cooling | | Second Heating | | | |
|---|---|---|---|---|---|---|
| | Tc1 (° C.) | DeltaH cryst (J/g) | Tm (° C.) | DeltaH melt (J/g) | Tc (° C.) | Tg (° C.) |
| Control 1 | — | — | 55.4 | 5.7 | 20 | −32 |
| Inventive 1 | 77.8 | 24.4 | 102.4 | 23.3 | — | −29 |
| Inventive 2 | 66.2 | 11.7 | 101.8 | 16.3 | — | −31 |
| Comparative A | 80.4 | 13.4 | 138.4 | 16.6 | — | −29 |
| Comparative B | 70.5 | 8.2 | 136.9 | 11.3 | — | −27.8 |

Both Inventive Examples 1 and 2 and Comparative Examples A and B show indications of crystallization as seen by the cooling peaks, which are referred to as the crystallization temperature (Tc1). Referring to FIGS. 1-5, Inventive Examples 1 and 2 and Comparative Examples A and B do not show a secondary cooling peak. However, as observed in FIGS. 2 and 3, respective Inventive Examples 1 and 2 exhibit much sharper cooling enthalpies over a much narrower temperature range (5-20° C.) in comparison to respective Comparative Examples A and B, which exhibit enthalpy peaks over a 30-50° C. temperature range. This is an indicator that Inventive Examples 1 and 2 exhibit faster crystallization rates in comparison to Comparative Examples A and B.

Materials for Comparative Blends

AFFINITY™ PL 1280G is a polyolefin plastomer having a melt index of 6 g/10 min (190° C./2.16 kg), a density of 0.900 g/cc, a DSC melting Peak (10° C./min) of 95° C., and is available from The Dow Chemical Company.

During manufacture, either AFFINITY™ PL 1280G or DS6D82 (a RCPP) is melt mixed with the respective P/E copolymer prior to pelletization. It is believed AFFINITY™ PL 1280G and DS6D82 may act as a nucleator in the composition. The AFFINITY™ PL 1280G is added for Comparative Formulations C and D and DS6D82 is added to Comparative Formulations E and F at the blend ratios (based on the total weight of the blend) shown in Table 9, below. The compositions are pelletized via underwater pelletization.

TABLE 9

Comparative Examples C-F Formulations

| Comparative | Nucleator added |
|---|---|
| C | 10 wt % AFFINITY ™ PL 1280G |
| D | 10 wt % RCPP DS6D82 |
| E | 17 wt % AFFINITY ™ PL1280G |
| F | 14 wt % RCPP DS6D82 |

The Comparative formulations C to F of Table 9 are subjected to DSC analysis, and the results are reported in Table 10, below, and FIGS. 6 to 9.

TABLE 10

DSC Results of Comparative Examples C-F

| Comparative | First Cooling | | | Second Heating | | | |
| --- | --- | --- | --- | --- | --- | --- | --- |
| | Tc1 (° C.) | Tc2 (° C.) | DeltaH cryst (J/g) | Tm (° C.) | DeltaH melt (J/g) | Tc (° C.) | Tg (° C.) |
| C | 61.8 | 77.3 | 6.7 | 97.1 | 13.2 | 20 | −30.9 |
| D | 48.2 | — | 9.9 | 134.5 | 19.9 | — | −31.2 |
| E | 61.8 | 77.2 | 8.7 | 96.7 | 11.3 | 18 | −29.8 |
| F | 66 | — | 14.7 | 135.7 | 19 | — | −30.7 |

Comparative Examples C and E under DSC cooling show prominent, sharp enthalpies over a narrow temperature range, an indication of relatively fast crystallization rates. However, the DSC second heat curves for Comparative Examples C and E show prominent secondary cooling peaks at about 20° C. and 18° C., respectively. This is an indication that at least a portion of the P/E copolymer component did not undergo crystallization during the first cooling. Comparative Examples D and F under DSC cooling show enthalpy peaks over a relatively broad temperature range (30-50° C.), an indication of relatively slower crystallization rates.

Referring to Table 7 and FIGS. 2 and 3, only Inventive Examples 1 and 2 did show prominent, enthalpy peaks over a narrow temperature range and a lack of a prominent secondary cooling peak during DSC second heating.

What is claimed is:

1. A composition, comprising:
   (A) 30-95 wt % of a random or homogeneous propylene-based interpolymer having: (i) a comonomer content of at least one of $C_2$ and $C_{4-10}$ α-olefins of 7 wt % to 49 wt % based on the total weight of the propylene-based interpolymer, (ii) a density of 0.90 g/cc or less, and (iii) an MFR of 1 g/10 min or greater (230° C./2.16 kg); and
   (B) 5-70 wt % of a block composite nucleator comprising:
      (1) a first polymer that includes polypropylene;
      (2) a second polymer that includes an alpha-olefin based polymer, the alpha-olefin being ethylene; and
      (3) a block copolymer having a first segment and a second segment, the first segment of the block copolymer having the same composition as the first polymer in the block composite nucleator and the second segment of the block copolymer having the same composition as the second polymer of the block composite nucleator, wherein the second segment of the block copolymer includes at least 80 wt % of the mer units derived from ethylene.

2. The composition as claimed in claim 1, wherein the first segment of the block copolymer includes at least 80 wt % of mer units derived from propylene.

3. The composition as claimed in claim 1, wherein the block composite nucleator is a nucleating agent and the composition excludes any other nucleating agents.

4. The composition as claimed in claim 1, further comprising a tackifier and at least one selected from the group of a wax and an oil.

5. The composition as claimed in claim 1, wherein a microstructure index of the block composite nucleator is greater than 1 and less than 20.

6. A composition, comprising:
   (A) 30-95 wt % of a random or homogeneous propylene-based interpolymer having: (i) a comonomer content of at least one of $C_2$ and $C_{4-10}$ α-olefins of 7 wt % to 49 wt % based on the total weight of the propylene-based interpolymer, (ii) a density of 0.90 g/cc or less, and (iii) an MFR of 1 g/10 min or greater (230° C./2.16 kg); and
   (B) 5-70 wt % of a block composite nucleator comprising:
      (1) a first polymer that includes polypropylene;
      (2) a second polymer that includes an alpha-olefin based polymer, the alpha-olefin being ethylene; and
      (3) a block copolymer having a first segment and a second segment, the first segment of the block copolymer having the same composition as the first polymer in the block composite nucleator and the second segment of the block copolymer having the same composition as the second polymer of the block composite nucleator, wherein the block copolymer includes 30-50 wt % of the second segment and 50-70 wt % of the first segment, with the first segment comprising 5-20 wt % of mer units derived from ethylene and the second segment comprising 85-95 wt % of mer units derived from ethylene.

7. A process for nucleating a homogeneous propylene/α-olefin copolymer, comprising:
   contacting under nucleating conditions the following:
   (A) 30-95 wt % of a random or homogeneous propylene-based interpolymer having: (i) a comonomer content of at least one of $C_2$ and $C_{4-1}$α-olefins of 7 wt % to 49 wt % based on the total weight of the propylene-based interpolymer, (ii) a density of 0.90 g/cc or less, and (iii) an MFR of 1 g/10 min or greater (230° C./2.16 kg); and
   (B) 5-70 wt % of a block composite nucleator comprising:
      (1) a first polymer that includes polypropylene;
      (2) a second polymer that includes an alpha-olefin based polymer, the alpha-olefin being ethylene; and
      (3) a block copolymer having a first segment and a second segment, the first segment of the block copolymer having the same composition as the first polymer in the block composite nucleator and the second segment of the block copolymer having the same composition as the second polymer of the block composite nucleator, wherein the second segment of the block copolymer includes at least 80 wt % of the mer units derived from ethylene.

* * * * *